March 1, 1955  H. J. BECK ET AL  2,703,261
TAPE TENSION PULLEY ASSEMBLY
Filed Nov. 24, 1951  4 Sheets-Sheet 1

INVENTORS
Hans Julius Beck
Erik Wilhelm Ehn
Kurt Ewald Lohmiller
Erwin Friedrich Schmid
BY Richard Low AG'T March 1, 1955

H. J. BECK ET AL 2,703,261

TAPE TENSION PULLEY ASSEMBLY

Filed Nov. 24, 1951

INVENTORS
Hans Julius Beck
Erik Wilhelm Ehn
Kurt Ewald Lohmiller
Erwin Friedrich Schmid BY Richard Low
AG'T March 1, 1955  H. J. BECK ET AL  2,703,261
TAPE TENSION PULLEY ASSEMBLY
Filed Nov. 24, 1951  4 Sheets-Sheet 3

INVENTORS
Hans Julius Beck
Erik Wilhelm Ehn
Kurt Ewald Lohmiller
Erwin Friedrich Schmid
BY Richard Krub AG'T

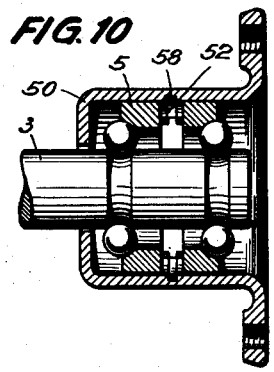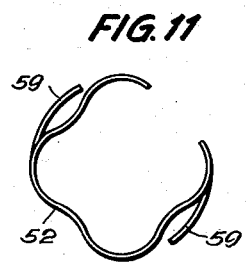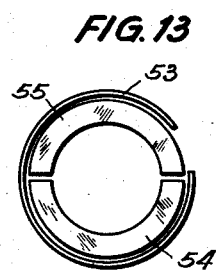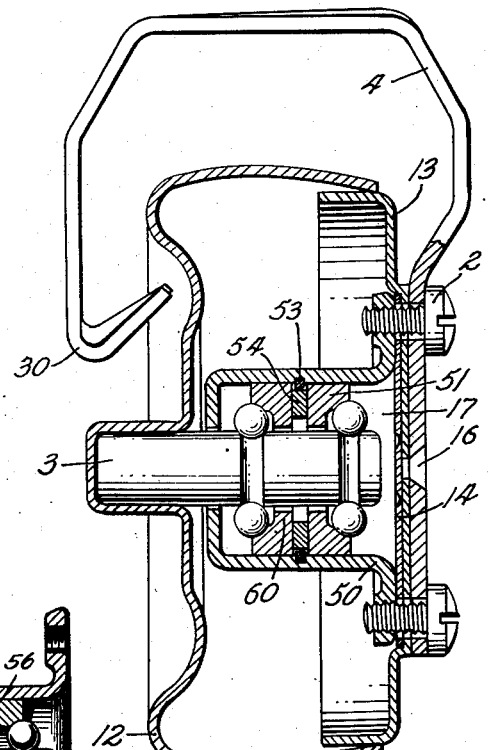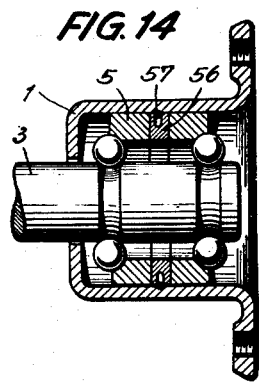

United States Patent Office 2,703,261
Patented Mar. 1, 1955

2,703,261

TAPE TENSION PULLEY ASSEMBLY

Hans Julius Beck, Stuttgart, Erik Wilhelm Ehn, Bad Cannstatt, Kurt Ewald Lohmiller, Waiblingen, and Erwin Friedrich Schmid, Stuttgart, Germany, assignors to Vereinigte Kugellagerfabriken, Aktiengesellschaft, Schweinfurt, Germany Application November 24, 1951, Serial No. 258,082

Claims priority, application Germany November 30, 1950

16 Claims. (Cl. 308—18)

This invention relates to a tape tension pulley assembly, particularly of the type as used for tape drives of textile spindles.

It is a matter of common knowledge that tension pulleys with anti-friction bearings for belt and tape drives are journalled upon a fixed shaft which, according to the load involved, is clamped either at both ends or one end. A different arrangement is described in Patent No. 2,023,556 wherein the pulley is shown to be arranged on a rotating shaft, the anti-friction bearings of which are enclosed in a housing that is fastened to the tension pulley support by means of a screw nut. In spite of its good running properties, this tension pulley is not applied to heavy drives because it calls for special pulley carriers of an expensive type. In addition, there is some disadvantage inherent in its construction due to the extremely wide base of the bearings which is a handicap, for example, to the employment of these pulleys in spinning machines with small spindle pitches.

When the tape catching device is made, as is most convenient, narrow and with little overhang, it must consist of two separate parts with regard to the assembly of the pulley. However, to save costs, the tape catching device is frequently made in only one piece, and it must then be taken into account that the pulleys are encompassed to a lesser degree. To be certain that the off-running tapes are caught, a very wide construction is then obligatory. Another disadvantage consists in the employment of large securing nuts by means of which the housing is fixed to the supporting unit. When these nuts are tightened, considerable stresses are exerted upon the housing which, even in light drives, requires a high quality material and heavy construction.

The present invention has for its object to remove these disadvantages by means of a novel pulley construction. Its particular advantage lies in the narrow design based on a close arrangement of the bearings. In connection with the simply arranged bearing clearance, there results a very good bearing performance. The space-saving fastening of the bearing housing to the pulley supporting unit will also permit the application of the tape tension pulley to small spindle pitches.

To the accomplishment of the foregoing and other objects which will hereinafter appear, my invention consists in the tension pulley assembly and its elements, and the relation of the latter one to the other, as hereinafter are more particularly described in the specification and sought to be defined in the claims. The specification is accompanied by drawings in which:

Fig. 10 is an axial section through a further modification of a tension pulley assembly;

Fig. 11 shows another spring washer;

Fig. 12 is an axial section through still another modified tension pulley assembly;

Fig. 13 shows a modified spring washer; and

Fig. 14 is an axial section again through a modified tension pulley assembly.

Figure 1:
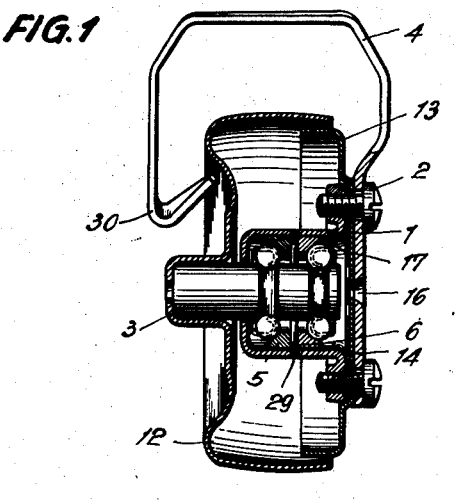
Fig. 1 is an axial section through a tension pulley assembly, embodying features of the invention.

Referring to the drawings, and more particularly to Fig. 1, the bearing housing 1 of the tension pulley 12 is fastened to the pulley supporting unit 4 by means of two screws 2 that are positioned symmetrical and parallel to the shaft 3. Due to this arrangement of the screws 2, the housing is only slightly stressed by the tensile forces exerted by the fastening means. The pulley supporting unit 4 is also designed as a tape catching device and straddles the belt side of the pulley 12. In the housing 1, two narrow and space-saving angular contact bearings 5 are positioned with their shoulders between both rows of balls. This arrangement of the angular contact bearing presents the great advantage of rendering it possible to place within minimum space limits a sturdy bearing that will stand up to the operational strains.

With the bearing outer rings set between the rows of balls, the rigidity is greater than in the case of other arrangements. Besides, this gives the possibility of enclosing the entire bearing within pulley 12. Moreover, a considerable saving in production costs is effected by grinding both outer rings of one bearing together in a single operation.

The space between both outer rings, and accordingly the bearing clearance, is determined by the thickness of the annular spring 6. This spring has also the purpose to fix the axial position of the bearings within the housing. Thus, a single part has two functions, which results in an additional cut in the production costs of the tension roller.

The bearing clearance should not exceed a certain amount to guarantee the serviceability of the roller. To determine the necessary thickness of the spring, the outer bearing rings shall be pressed against the rows of balls when mounting, and the space between the two outer rings measured. In this manner, the correct spring may be chosen from the various sizes that will be held in stock. This will not only result in a reduction of the tilting play but also in a compensation of the machining tolerances.

The narrow and yet sturdy bearing and the method chosen for fastening the bearing housing to the supporting unit, will allow to keep the entire tension pulley arrangement so narrow that it may be used in spinning machines with the smallest possible pitch.

Figure 2:
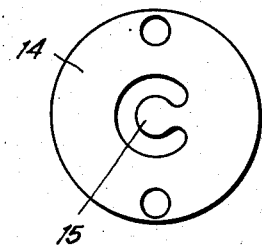
Fig. 2 shows a lubricating disc as used with this pulley.

Whereas the shell-like pulley 12 fixed to one end of the shaft 3 covers the forward end of the pulley, a safety cap 13 prevents foreign matter from entering on the opposite side. There is a gasket 14 which may be of the shape shown in Fig. 2. By means of an elastic blade 15, the lubricating hole 16 and, hence, the space 17 are sealed off. Owing to the lubricating pressure, the way to the inside of the bearing is opened. When the pressure ceases, the blade returns to its original position.

Figure 3:
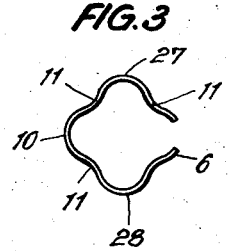
Fig. 3 illustrates a specially shaped spring washer.
Figure 4:
Fig. 4 is a section therethrough at a larger scale.

Fig. 3 shows a particularly convenient shape of a spring washer 6. It consists of a number of arcs forming a square. The cross section which may be substantially circular is flattened on two sides as shown in Fig. 4. The space between these two faces of the spring 6 determines the width thereof and, in conjunction with the two outer rings 5, fixes the bearing clearance. By choosing the appropriate width, as described above, the desired clearance is obtained. The outwardly protruding sections 10, 27 and 28 of the spacer 6 fit into an interior peripheral groove 29 in the housing and position the bearing assembly in the axial direction of the shaft. The inwardly projecting arcs 11 contact with their side faces the outer rings of the cone bearings 5. To disassemble the pulley bearings, one first removes both fastening screws 2 and then the whole pulley from the supporting unit 4.

After pulling off the pulley shell 12 by means of a tongs-like tool, the gripping ends of which fit into the groove 29, the spring 6 is compressed at its parts 27 and 28, forcing them to leave the groove in the housing. Thereupon, the entire bearing may be withdrawn. In reassembling, it must, however, be observed that the sections 10, 27 and 28 of the annular spring 6 bear again against the groove 29.

The narrowness of the entire arrangement of the tension pulley is facilitated by properly profiling the pulley shell 12, the more so as the pulley supporting unit 4 designed as a tape catching device may be kept especially slender, the hook-shaped end 30 of the belt guide engaging into a trough-shaped section of the pulley. Thereby, a particularly reliable catching of the tape is effected at the same time.

Figure 5:
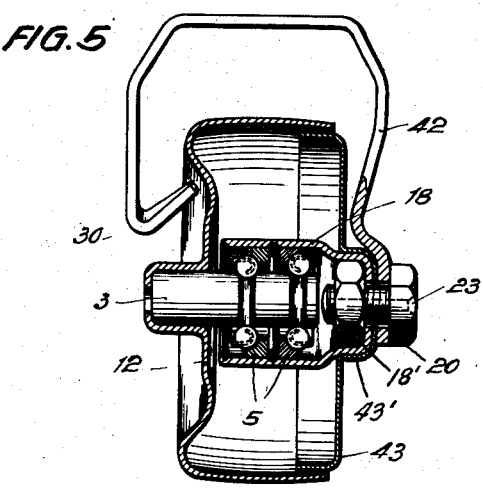
Fig. 5 is an axial section through a modified assembly, using only one nut.

In the embodiment according to Fig. 5, the bearing housing 18 is provided at one end with a vaulted extension 18′, and the protective cap 43 has a central portion 43′ which is shaped to fit over the extension 18′. A single screw 20 fastens the bearing housing and the protective cap to the pulley unit 42. Screw 20 passes through the central portion 43′ and the vaulted extension 18′. In the housing 18 are contained, in the same arrangement as in Fig. 1, the two angular contact bearings 5 which are lubricated through a bore 23 provided in the fastening screw 20.

Figure 6:
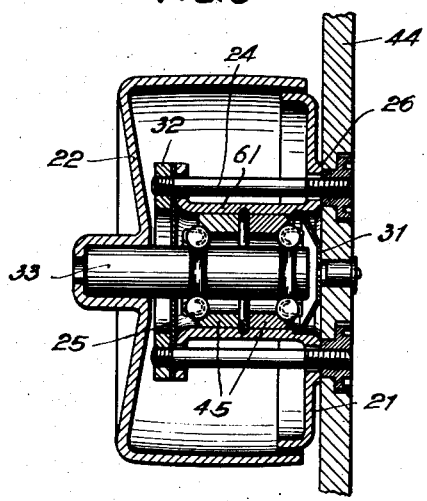
Fig. 6 is an axial section through another modified assembly for particularly highly stressed pulleys.

In heavy drives, a pulley as shown in Fig. 6 is employed. It is journalled much as in Fig. 1, but the base of the bearings is wider. This results in wider outer rings 45 and a considerable improvement of the seat. Two pin bolts 24 extending from the supporting unit 44 to the retaining ring 32 serve at attach the pulley to the supporting unit 44. Between the bearing housing 61 and the retaining ring 32 there is a gasket 25.

The long pin bolts 24 are primarily used in idlers that are subjected to heavy vibrations because if they are elastic and owing to their length they have a great energy and thus the forces to be absorbed are comparatively small. By special fitting surfaces 26, which may be annular in shape, a reliable seat upon the supporting unit 44 is achieved. As a safety device to the bearings, an insert 31 is employed that fits between the housing 61 and the pulley supporting unit 44. Besides, the housing 61 is integral with the safety cap 21.

When the outer rings of the angular contact bearing 5 are much oversized with respect to the housing 61, it may happen that the square spring described in Fig. 3 gets jammed between the two shoulders. Only by tapping or knocking against the bearing, the spring will overcome the frictional resistance and the spacer will drop into the recess of the housing 61.

Figure 7:
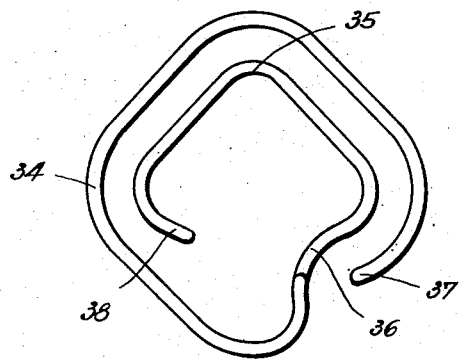
Fig. 7 shows, at a larger scale, a spring washer which may replace that of Fig. 3.

By forming the retaining spring as shown in Fig. 7, the outer section 34 which secures the bearing against axial displacement will not get wedged in because it is slightly less thick than the spacer section 35 that secures the distance between both bearings. This helical spring, shown at an enlarged scale, is so formed that it can be inserted, when compressed, into the housing 1, and then it snaps into position due to its tension. This is effected by means of two one-piece sections or turns, preferably generally square-shaped with the corners rounded off and lying in one another. The sides that connect the corners or arcs may also be more or less inwardly bent as shown in Fig. 3. The cross section of the spring may be circular with flattened sides, rectangular, square, or present some other suitable profile. The recess 36 facilitates the compression of the ring because it allows ample space for its end 37 when the spring is compressed for inserting. The other end 38 may be slightly bent inwardly to provide ample spring displacement.

Figure 8:
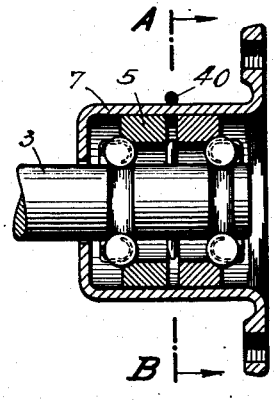
Fig. 8 is an axial section through still another modification, using a U-shaped spacer for securing the position of the pulley bearing outer races.
Figure 9:
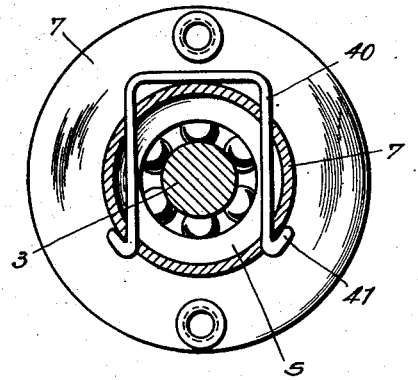
Fig. 9 is a section taken in the plane of the line A—B of Fig. 8.

A different method of securing the bearing outer rings against axial displacement and of holding the mutual distance between the outer rings is shown in Figs. 8 and 9. Between the collars 5 of the anti-friction bearings there is inserted a U-shaped retaining and spacing piece 40. To keep it in position, the ends 41 are bent outwardly. There are naturally other possibilities to secure this piece against displacement, for example, a notch on each end of the spring to be pressed against the housing. The cross section of the spring may have one of the various profiles mentioned in connection with Figs. 3 and 4. There may also be many variations in the design of the spacer as well in that of the whole tension roller.

Referring to Fig. 10, in order to determine the space between the two outer rings 5 and to simultaneously secure these rings axially, with tightly pressed-in outer rings, a locking device 52 is predominantly used. It consists of a tape which, in side view, preferably looks like that shown in Fig. 3, i. e. with alternating concave and convex arcs approximately forming a square. Projecting tongues 59 are punched out of this tape. The tongues 59 resiliently gear into a groove 58 in the bearing housing, with the broad part of the tape reclining against the outer rings 5.

It is also possible to use a locking device of several component parts, as shown in Figs. 12 and 13. This construction provides for a split ring 54 and 55 to determine the space. The locking device may also be composed of one part only, or of more than two parts. This spacing ring is embraced by a somewhat less broader ring 53 which when mounted, on the one hand, gears into the bearing housing 50 and, on the other hand, engages between the ball bearing outer rings 51. The ring 53 may be of a circular design as shown in Fig. 13 or of a design similar to that shown in Fig. 3.

When one uses two concentrically arranged members to form a retaining element and the inner member is broader than the outer member, the inner member may be provided externally with a groove. In such a case this external groove approximates in width a groove internally provided in the bearing housing. The outer member then projects into both grooves.

In case of a press fit, the exterior part, as is well known, is expanded while the interior part is compressed due to the tension existing between the two parts. Because of the air needed in the bearing which in the present case is to be kept within close limits, the dimensional changes said press fit entails are preferably allowed for in the bearing housing. This is necessary particularly in view of the manufacturing tolerances as, otherwise, the bearing clearance would be subject to too great a change. It is, therefore, expedient to have the outer rings 51 additionally reinforced, e. g. by way of a collar 60, since the thickness of the walls of the bearing housing 50 cannot be changed at will.

Fig. 14 shows a construction with the space of the bearing outer rings 5 being determined by an annular part 56. A resilient ring 57 gears into grooves provided for in the part 56 and in the bearing housing 1 and holds the outer rings axially in position. This resilient ring may be circularly designed, as well as with curving lines as described hereinbefore.

In weight-saving constructions, the pulley, the housing and all parts that are less stressed may be made from materials of a low specific gravity.

It is believed that the present invention, as well as the construction and operation of the forms shown for practicing the invention, and the many advantages thereof, will be fully understood from the foregoing detailed description. While the invention has been shown and described in a few forms only, it will be apparent that many changes and modifications may be made without departing from the spirit of the invention defined in the following claims.

We claim:

1. Tape tension pulley assembly, particularly for tape drives of textile spindles, comprising a bowl-shaped pulley member, the side wall of the bowl forming the belt-receiving drum portion, and the bottom of the bowl forming a closing side of said assembly, a shaft, said side being provided with a cuplike formation to receive the end of the shaft, a bearing for the shaft, said bearing including two rows of balls, two outer bearing rings angularly contacting the balls, and a retaining element holding the bearing rings in their axial position and in their proper position relative to each other, a bearing housing, a bowl-shaped protective cap complementing said side to form an enclosure for the assembly, and a support for the assembly, said support being removably secured to the bearing housing.

2. In the assembly according to claim 1, the bearing housing being provided at one end with an annular flange, a disclike gasket, axially aligned fastening means, said fastening means securing the protective cap to said flange, the gasket being placed between the flange and the protective cap.

3. In the assembly according to claim 2, the support being placed against the protective cap, said fastening means securing the support, the protective cap and the bearing housing together.

4. In the assembly according to claim 1, the bearing housing being provided with a circumferentially extending interior groove, a resilient retaining ring being partly received in said groove.

5. In the assembly according to claim 1, the bearing housing being provided at one end with a vaulted extension, the protective cap having a central portion shaped correspondingly to said extension, a single fastening member securing said vaulted extension, said central portion and the support together.

6. In the assembly according to claim 1, the retaining element being of an open generally square form.

7. In the assembly according to claim 6, the square being formed by alternating concave and convex arcs.

8. In the assembly according to claim 1, the retaining element forming substantially two turns of a spiral of generally square form, the cross sections of the turns being different, the cross section of the outer turn securing the bearing rings against axial displacement, the cross section of the inner turn securing the distance between the bearing rings.

9. In the assembly according to claim 1, the retaining element being essentially U-shaped, the bearing housing being provided with bores, portions of the loop of the U being inside the bearing housing and portions of the loop being outside the bearing housing, the ends of the U being bent away and securing the retaining element in position.

10. In the assembly according to claim 1, the retaining element being of an open generally square form and being provided with tongues projecting substantially longitudinally of the sides of the square, the bearing housing being provided interiorly with a groove, the said tongues projecting into said groove.

11. In the assembly according to claim 1, the bearing housing being provided interiorly with a groove, the retaining element consisting of two concentrically arranged members, the inner member serving to space the bearing rings, the outer member projecting into said groove and into the space between the bearing rings.

12. In the assembly according to claim 1, the bearing housing being provided interiorly with a groove, the retaining element consisting of two annular concentrically arranged members, the inner member being broader and being provided externally with a groove, the outer member being narrower and simultaneously projecting into both grooves.

13. In the assembly according to claim 1, the support having the shape of a bail, the pulley being provided with a cavity inwardly of the belt course, the tape-catching device being hook-shaped and extending into said cavity without touching the pulley.

14. In the assembly according to claim 1, axially aligned fastening means securing the bearing housing and the protective cap to the pulley assembly.

15. In the assembly according to claim 1, both the support and the protective cap being provided with a lubricating hole, a gasket being inserted between the bearing housing and the protective cap to elastically seal off the aligned lubricating holes against the outside.

16. In the assembly according to claim 1, the bearing rings being provided with reinforcements so that dimensional changes occurring when the rings are pressed in place chiefly affect the bearing housing.

References Cited in the file of this patent

UNITED STATES PATENTS

| | | |
|---|---|---|
| 853,371 | Nims | May 14, 1907 |
| 2,039,875 | Benson | May 5, 1936 |
| 2,056,946 | Ankeny | Oct. 13, 1936 |
| 2,192,147 | Nutting | Feb. 27, 1940 |
| 2,204,084 | Hughes | June 11, 1940 |

FOREIGN PATENTS

| | | |
|---|---|---|
| 542,669 | Great Britain | Jan. 22, 1942 |